(12) United States Patent
Kawawada et al.

(10) Patent No.: US 6,252,322 B1
(45) Date of Patent: Jun. 26, 2001

(54) SPINDLE MOTOR

(75) Inventors: Naoki Kawawada; Tadao Iwaki; Takahumi Suzuki; Hiromitsu Goto, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/411,584

(22) Filed: Oct. 1, 1999

(30) Foreign Application Priority Data

Oct. 1, 1998 (JP) .................................................. 10-280178
Feb. 12, 1999 (JP) .................................................. 11-034819

(51) Int. Cl.[7] ............................ H02K 5/16; H02K 5/167; F16C 17/00
(52) U.S. Cl. ............................... 310/90; 310/42; 310/89; 310/67 R; 310/91; 384/107; 384/100; 360/99.08
(58) Field of Search ..................................... 384/100, 107, 384/112, 113, 114, 121, 123; 310/67 R, 90, 91, 42, 89; 360/99.08

(56) References Cited

U.S. PATENT DOCUMENTS

| 5,723,927 | * | 3/1998 | Teshima | 310/90 |
| 5,822,846 | * | 10/1998 | Moritan et al. | 310/90 |
| 5,982,066 | * | 11/1999 | Marracino et al. | 310/91 |
| 6,002,188 | * | 12/1999 | Yagi | 310/90 |
| 6,033,118 | * | 3/2000 | Asai et al. | 384/115 |
| 6,082,903 | * | 7/2000 | Saneshige | 384/279 |

* cited by examiner

Primary Examiner—Burton Mullins
(74) Attorney, Agent, or Firm—Adams & Wilks

(57) ABSTRACT

A spindle motor comprises a base, a stator coil connected to the base, and a sleeve-and-bearing unit connected to a central portion of the base. The sleeve-and-bearing unit has a sleeve and a bearing section mounted in the sleeve having a linear expansion coefficient greater than that of the sleeve. The sleeve has a groove disposed in an outer peripheral surface thereof for receiving an adhesive material for connecting the base to the outer peripheral surface of the sleeve. A rotor unit is connected to the sleeve-and-bearing unit for undergoing rotation relative to the sleeve-and-bearing unit. The rotor unit has a shaft section supported by the bearing section for undergoing rotation, a hub connected to the shaft section for rotation therewith, and a rotor magnet connected to the hub and disposed opposite to and spaced apart from the stator coil.

44 Claims, 5 Drawing Sheets

SPINDLE MOTOR

BACKGROUND OF THE INVENTION

1. Field of the Invention

The present invention relates to spindle motors and, more particularly, to a spindle motor having unitized components so that faulty components can be replaced and modification can be made without replacing the entire spindle motor or discarding useable components.

2. Background Information

In the related-art spindle motors to be built into various apparatuses including hard disc drive apparatuses, there is known a structure having a rotor hub and sleeve that are combined by arranging a shaft on a motor frame or a structure having a rotor hub and shaft that are combined by attaching a sleeve onto a motor frame (e.g. Japanese Patent Laid-Open No. 245427/1994).

Also, there is adopted a structure for a spindle motor by directly assembling on an apparatus a ball bearing or bearing as a part of the motor.

In the former structure, however, there has been a problem that if the motor assembled upon manufacture becomes faulty, it must be scrapped entirely. There has arisen another problem that, where there are diversified specifications, the number of parts has to be increased on a model-by-model basis.

In the latter structure, on the other hand, the parts are directly assembled into the apparatus and hence some motor parts are integrated with the mating apparatus structure in order to reduce the apparatus size. However, when there occurs faulty in the apparatus, the apparatus as a whole has to be scrapped causing an increase in cost.

It is therefore an object of the present invention to provide a spindle motor which is capable of solving the problems as encountered in the related art.

SUMMARY OF THE INVENTION

In order to solve the foregoing problems in the conventional art, the present invention provides a spindle motor comprising a sleeve fixed in a base; a bearing section rotatably accommodated and held in the sleeve; a shaft section attached to the bearing section; a hub attached co the shaft; a rotor magnet mounted on the hub; a stator coil arranged close to the rotor magnet; and wherein at least one portion is included which is made as a unit formed by two and more of the constituent elements. This enables checking on a unit-by-unit basis during manufacture. It there is an unacceptable unit, it is satisfactory to merely scrap the sane unit. In a case that some parts require modification due to diversification of specifications, the unitized common parts can be still used without change, making it unnecessary to increase parts for each model.

Also, such unitization makes it possible to cope with an unacceptable unit by merely removing it. Thus, cost reduction is to be expected.

In this manner, parts can be made common for all the models, resulting in cost reduction. Furthermore, even where it is built in an apparatus and thereafter becomes poor, the apparatus and its parts can be reusable.

According to the invention, there is provided a spindle motor, further comprising: the base; a stator coil arranged in the base; a sleeve-and-bearing unit formed by attaching the bearing in the sleeve arranged in a center position of the base; and a rotor unit having a shaft section arranged in the bearing section and an inner peripheral surface mounted with the rotor magnet opposed to the stator coil.

The base may be exclusive one prepared for the spindle motor. Alternatively, it is possible to utilize as the base one part of a frame of an apparatus on which the spindle motor is to be mounted.

In the invention, an adhesive groove can be provided in an outer peripheral surface of the sleeve to hold an adhesive for fixing the sleeve to the base, and the sleeve at the outer peripheral surface being fixed to the base through the adhesive.

The shaft section may have a tip formed with a convex spherical surface, thereby reducing a frictional force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve being formed of a stainless based metal material.

The bearing section is formed by a fluid dynamic pressure bearing.

Also in this case, the shaft section has a tip formed by a convex spherical surface to thereby reduce a frictional force to be applied to the shaft section at a start and stop of the motor.

Furthermore, the bearing section may have a linear expansion coefficient greater than that of the sleeve, thereby having less effects upon the shaft rigidity due to temperature change.

Due to this, the bearing section may be formed of a copper based metal material, and the sleeve being formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove be formed in at least one side surface of the bearing section. With this structure, the dynamic pressure producing grooves may be satisfactorily formed only in the surface of the bearing section, thus facilitating forming and hence improving forming efficiency.

Also, a radial dynamic pressure groove may be formed in an outer peripheral surface of the bearing section and thrust dynamic pressure producing grooves may be formed in respective side surfaces.

The sleeve may be in a cap form, and the bearing section in the sleeve being rotatably held in the sleeve by an annular pressing member press-fitted in the sleeve.

In this case, the sleeve has an inner peripheral surface end edge projecting greater than the pressing member to thereby form an adhesive reservoir close to the inner peripheral surface end edge of the sleeve, preventing the adhesive from flowing to an outside.

The base and the rotor unit at an outer peripheral edge may form an opposed portion, and a labyrinth is formed in the opposed portion. In the event that dusts, such as magnetic particles or oil mist, accumulate at an inside portion, the above structure can prevent the magnetic particles and dusts from being discharged to an outside. This is very effective if applied for a hard disc drive apparatus.

A wide annular groove may be circumferentially formed in an outer peripheral surface of the sleeve, and the sleeve being press-fitted in a fitting hole opened correspondingly in the base to the sleeve thereby fixing the sleeve to the base. Fixing is possible without using an adhesive, improving operationality.

The annular groove may be also utilized as an adhesive groove, and the sleeve being fixed to the base using both press-fit and adhesion, thereby providing further firm fixing.

The annular groove may be formed in a corresponding position to the bearing section, thereby preventing a deforming stress to be applied to the bearing section upon press-fitting.

The shaft section may have a tip formed with a convex spherical surface, thereby reducing a frictional force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may be formed by a fluid dynamic pressure bearing.

The shaft section may have a tip formed with a convex spherical surface, thereby reducing a friction force to be applied to the shaft section at a start or stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove may be formed in a side surface of the bearing section. With this structure, the dynamic pressure producing grooves may be satisfactorily formed only in the surface of the bearing section, thus facilitating the forming and hence improving forming process efficiency.

Also, a radial dynamic pressure producing groove may be formed in an outer peripheral surface of the bearing section and a thrust dynamic pressure producing groove may be formed in both side surfaces of the bearing section.

The sleeve may be in a cap form, and the bearing section in the sleeve being held in the sleeve by an annular pressing member press-fitted in the sleeve.

In this case, the sleeve may have an inner peripheral surface end edge projecting greater than the pressing member to thereby form an adhesive reservoir close to the inner peripheral surface end edge of the sleeve, preventing the adhesive from flowing outside.

The base and the rotor unit at an outer peripheral edge may form an opposed portion, and a labyrinth may be formed in the opposed portion. In the event that dusts, such as magnetic particles or oil mist, accumulate at an inside portion, the above structure can prevent the magnetic particles and dusts from being discharged outside.

According to the invention, there is provided a spindle motor, further comprising: the base; a stator coil arranged in the base; a sleeve-bearing-shaft unit having the bearing section and the shaft section rotatably supported by the bearing section in the sleeve arranged in a center position of the base; and a hub unit having an inner peripheral surface mounted with the rotor magnet opposed to the stator coil and attached to the shaft section.

In case that the hub is changed in shape, it is satisfactory to change only the hub unit, requiring less increase in cost needed by the change.

The manner of connection fixing between the sleeve-bearing-shaft unit and the base may be by adhesion and press-fit or, of course, a combination of them.

Also in the invention, the constituent elements may be as follows.

The shaft section may have a tip formed with a convex spherical surface, thereby reducing a friction force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve being formed of a stainless based metal material.

The bearing section may be formed by a fluid dynamic pressure bearing.

Also in this case, the shaft section has a tip formed by a convex spherical surface to thereby reduce a frictional force to be applied to the shaft section at a start and stop of the motor.

Furthermore, the bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove be formed in one side surface of the bearing section. With this structure, the dynamic pressure producing grooves may be satisfactorily formed only in the surface of the bearing section, thus facilitating forming and hence improving forming efficiency.

Also, a radial dynamic pressure groove may be formed in an outer peripheral surface of the bearing section and thrust dynamic pressure producing grooves be in respective side surfaces.

The sleeve may be in a cap form, and the bearing section in the sleeve may be rotatably held in the sleeve by an annular pressing member press-fitted in the sleeve.

In this case, the sleeve has an inner peripheral surface end edge projecting greater than the pressing member to thereby form an adhesive reservoir close to the inner peripheral surface end edge of the sleeve, preventing the adhesive from flowing outside.

The base and the rotor unit at an outer peripheral edge may form an opposed portion, and a labyrinth may be formed in the opposed portion. In the event that dusts, such as magnetic particles or oil mist, accumulate at an inside portion, the above structure can prevent the magnetic particles and dusts from being discharged outside.

A wide annular groove may be circumferentially formed in an outer peripheral surface of the sleeve, and the sleeve may be press-fitted in a fitting hole opened correspondingly in the base to the sleeve thereby fixing the sleeve to the base. Fixing is possible without using an adhesive, improving operationality.

The annular groove may be also utilized as an adhesive groove, and the sleeve may be fixed to the base using both press-fit and adhesion, thereby providing further firm fixing.

The annular groove may be formed in a corresponding position to the bearing section, thereby preventing a deforming stress to be applied to the bearing section upon press-fitting.

The shaft section may have a tip formed with a convex spherical surface, thereby reducing a frictional force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may be formed by a fluid dynamic pressure bearing.

The shaft section may have a tip formed with a convex spherical surface, thereby reducing a frictional force to be applied to the shaft section at a start or stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove may be formed in a side surface of the bearing section. With this structure, the dynamic pressure producing grooves may be satisfactorily formed only in the surface of the bearing section, thus facilitating forming and hence improving forming efficiency.

Also, a radial dynamic pressure producing groove may be formed in an outer peripheral surface of the bearing section and a thrust dynamic pressure producing groove may be formed in both side surfaces of the bearing section.

The sleeve may be in a cap form, and the bearing section in the sleeve may be held in the sleeve by an annular pressing member press-fitted in the sleeve.

In this case, the sleeve may have an inner peripheral surface end edge projecting greater than the pressing member to thereby form an adhesive reservoir close to the inner peripheral surface end edge of the sleeve, preventing the adhesive from flowing outside.

The base and the rotor unit at an outer peripheral edge may form an opposed portion, and a a labyrinth may formed in the opposed portion. This prevents magnetic particles from being discharged outside.

According to the invention, there is provided a spindle motor, further comprising: a base unit having the stator coil mounted inside the base; a stator coil arranged in the base; a sleeve-bearing-shaft unit having the bearing section and the shaft section rotatably supported by the bearing section in the sleeve arranged in a center position of the base; and a hub unit having an inner peripheral surface mounted with the rotor magnet opposed to the stator coil arid attached Lo the shaft section.

This structure uses a unit having a stator coil mounted on a base unit, and is easy to assemble and improve the operability of the spindle motor as compared to the case of mounting a stator coil single part.

The type of fixing connection between the base unit and the sleeve-bearing-shaft unit may be by any of adhesion, press-fit or a combination of them.

In the invention, the constituent elements may be as follows.

The shaft section may have a tip formed with a convex spherical surface, thereby reducing a frictional force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section is formed by a fluid dynamic pressure bearing.

Also in this case, the shaft section has a tip formed by a convex spherical surface to thereby reduce a frictional force to be applied to the shaft section at a start and stop of the motor.

Furthermore, the bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove may be formed in at least one side surface of the bearing section. With this structure, the dynamic pressure producing grooves may be satisfactorily formed only in the surface of the bearing section, thus facilitating forming and hence improving forming efficiency.

Also, a radial dynamic pressure groove may be formed in an outer peripheral surface of the bearing section and thrust dynamic pressure producing grooves may be formed in respective side surfaces.

The sleeve may be in a cap form, and the bearing section in the sleeve may be held in the sleeve by an annular pressing member press-fitted in the sleeve.

In this case, the sleeve has an inner peripheral surface end edge projecting greater than the pressing member to thereby form an adhesive reservoir close to the inner peripheral surface end edge of the sleeve, preventing the adhesive from flowing outside.

The base and the hub unit at an outer peripheral edge may form an opposed portion, and a labyrinth may be formed in the opposed portion. In the event that dusts, such as magnetic particles or oil mist, accumulate at an inside portion of the spindle motor, the above structure can prevent the magnetic particles and dusts from being discharged outside.

A wide annular groove may be circumferentially formed in an outer peripheral surface of the sleeve, and the sleeve may be press-fitted in a fitting hole opened correspondingly in the base to the sleeve thereby fixing the sleeve to the base. Further firm fixing may be made by utilizing the annular groove as an adhesive groove and by both press-fit and adhesion of the sleeve to the base.

The annular groove may be formed in a corresponding position to the bearing section, thereby preventing a deforming stress to be applied to the bearing section upon press-fitting.

The shaft section may have a tip formed with a convex spherical surface, thereby reducing a frictional force to be applied to the shaft section at a start and stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may be formed by a fluid dynamic pressure bearing. In such a case, the constituent elements may be as follows.

The shaft section may have a tip formed with a convex spherical surface, thereby reducing a frictional force to be applied to the shaft section at a start or stop of the motor.

The bearing section may have a linear expansion coefficient greater than that of the sleeve, thereby having less effects upon the shaft rigidity due to temperature change.

Due to this, the bearing section may be formed of a copper based metal material, and the sleeve may be formed of a stainless based metal material.

The bearing section may have a vertical circulatory groove provided in an inner peripheral surface thereof to enable a dynamic pressure producing liquid to be circulated around the bearing section.

A space may be formed by the shaft section, the bearing section and the sleeve to collect a dynamic pressure fluid, thereby smoothing the supply of a dynamic pressure fluid.

A radial dynamic pressure producing groove may be formed in an outer peripheral surface of the bearing section and a thrust dynamic pressure producing groove may be formed in a side surface of the bearing section. With this structure, the dynamic pressure producing grooves may be satisfactorily formed only in the surface of the bearing section, thus facilitating forming and hence improving forming efficiency.

Also, a radial dynamic pressure producing groove may be formed in an outer peripheral surface of the bearing section and a thrust dynamic pressure producing groove may be formed in both side surfaces of the bearing section.

The sleeve may be in a cap form, and the bearing section in the sleeve may be held in the sleeve by an annular pressing member press-fitted in the sleeve.

In this case, the sleeve may have an inner peripheral surface end edge projecting greater than the pressing member to thereby form an adhesive reservoir close to the inner peripheral surface end edge of the sleeve, preventing the adhesive from flowing outside.

The base and the hub unit at an outer peripheral edge may form an opposed portion, and a labyrinth formed in the opposed portion. In the event that dusts, such as magnetic particles or oil mist, accumulate at an inside portion, the magnetic particles and dusts can be prevented from being discharged outside.

DETAILED DESCRIPTION OF THE PREFERRED EMBODIMENTS

Embodiments of the present invention will be described with reference to the drawings.

Figure 1:
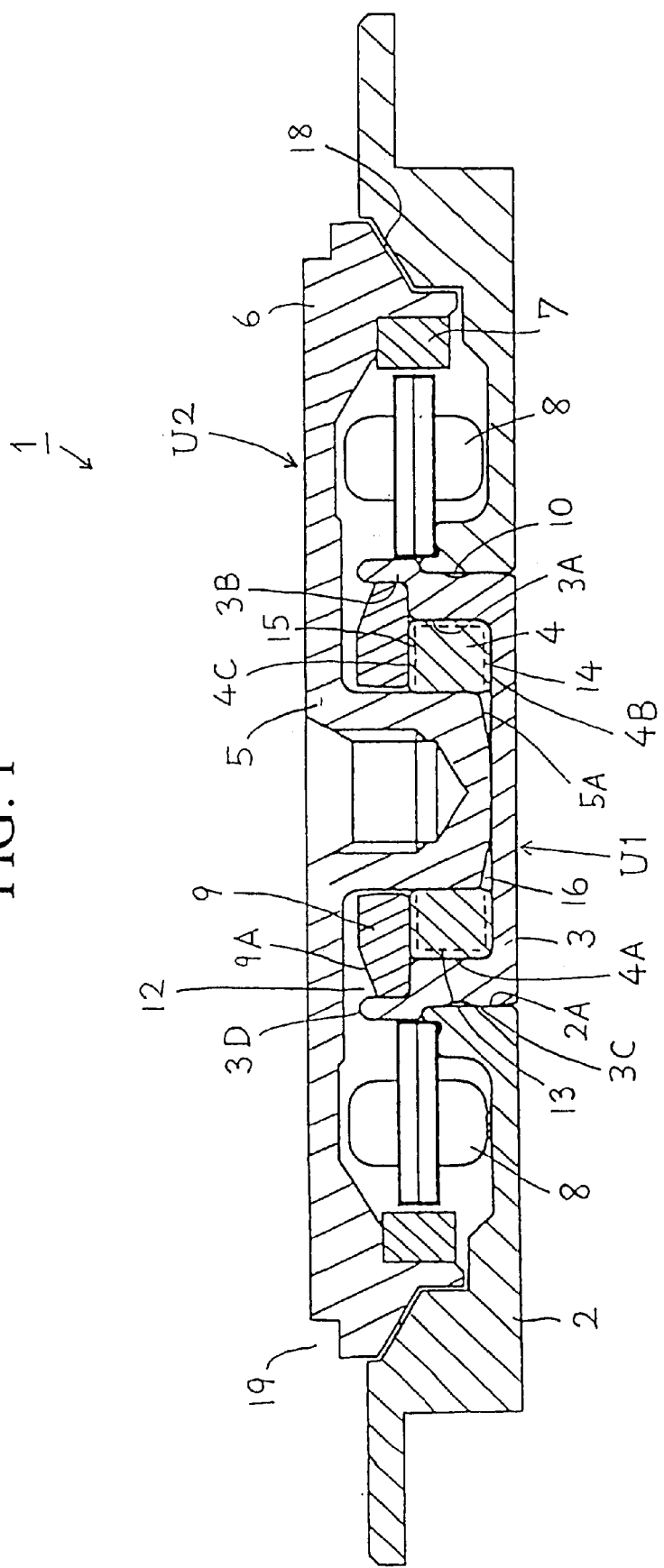
FIG. 1 is a sectional view showing a first embodiment of a spindle motor according to the present invention.

Referring to FIG. 1, there is illustrated a sectional view showing a first embodiment of a spindle motor according to the present invention. A spindle motor 1 comprises a base 2, a sleeve 3 received in the base 2, a bearing section 4 accommodated and held in the sleeve 3, a shaft section 5 rotatably supported by the bearing section 4, a hub 6 formed integral with the shaft section 5, a rotor magnet 7 fixed on the hub 6, and a stator coil 8 arranged in the vicinity of the rotor magnet 7. The hub 6 is formed with a disc mount 19 for placing thereon a disc (not shown) as a magnetic medium.

The base 2 is formed as a case member having a fitting hole 2A to receive the sleeve 3. The sleeve 3 is fixed with the stator coil 8 through a proper means. The base 2 may be a member exclusive for the spindle motor 1, or alternatively an apparatus frame on which the spindle motor 1 is to be mounted.

The sleeve 3 is a cap-like member having the annular bearing section 4 arranged at an inside thereof in a manner slightly spaced from an inner peripheral surface 3A. The sleeve 3 is formed at its inside with an annular step 3B press-fitted with an annular hold member 9. Thus, the bearing section 4 is rotatably supported at a predetermined position in the sleeve 3.

In the present embodiment, the sleeve 3, bearing section 4, and hold member 9 are made as a unit, i.e. structured as a sleeve-and-bearing unit U1. This sleeve-and-bearing unit U1 will be handled as one unit part in a factory.

As a consequence, during assembling of the spindle motor 1 a bearing section can be provided in the base 2 by merely fixing the sleeve-and-bearing unit U1 to the base 2.

In the illustrated embodiment, an adhesion groove 10 is circumferentially formed in an outer peripheral surface 3C of the sleeve 3. In a state that an adhesive is filled in the adhesion groove 10, the sleeve-and bearing unit U1 is fitted and fixed in a fitting hole 2A through adhesion. The provision of the adhesion groove 10 enables positive adhesion between the base 2 and the sleeve 3.

Alternatively, the fixing between the base 2 and the sleeve 3 may be made by press-fit instead of adhesion.

Figure 2:
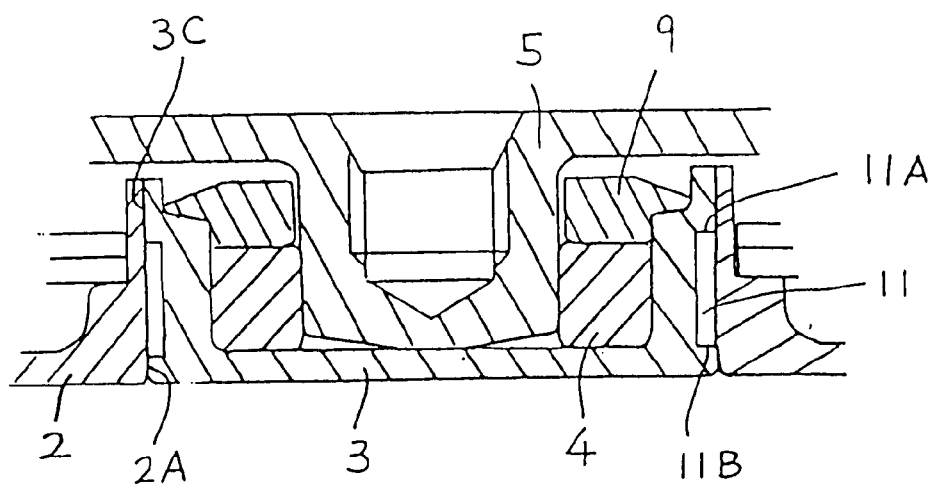
FIG. 2 is an essential part sectional view of a modification to the spindle motor in FIG. 1 wherein a sleeve is press-fit and fixed in a base.

Referring to FIG. 2, there is illustrated an essential part sectional view showing a structure where the sleeve 3 is press-fitted in the base 2. In this case, a groove 11 is formed wide in the outer peripheral surface 3C of the sleeve 3. The groove 11 is provided correspondingly to the bearing section 4 in order to prevent the force acting on the outer peripheral surface of the sleeve 3 from being applied to the bearing section 4 when the sleeve 3 is press-fitted into the fitting hole 2A of the base 2. That is, the groove 11 has an upper end edge 11A positioned above the bearing section 4 and a lower end 11B below the bearing section 4.

Incidentally, if the sleeve 3 is press-fitted in the base 2 with the groove 11 filled with an adhesive, both members are fixed by both press-fit and adhesion, providing further firm fixing.

Referring back to FIG. 1, the hold member 9 is formed with a taper 9A at a top outer edge and further the sleeve 3 has an annular top edge 3D projecting above the taper 9A of the hold member 9. This forms an annular adhesive reservoir 12. As a result, when the hold member 9 is fixed on the sleeve 3 through an adhesive, any extra adhesive leaked through between the hold member 9 and the sleeve 3 is collected in the adhesive reservoir 12 and effectively prevented from flowing out to an outside of the sleeve 3. Accordingly, there is less possibility that the adhesive will contaminate an interior of the spindle motor 1 which results in poor characteristics.

The bearing section 4 in the present bearing is structured as a liquid dynamic pressure bearing. That is, a radial dynamic pressure producing groove 13 is formed in an outer peripheral surface 4A of the bearing section 4. Thrust dynamic pressure producing grooves 14, 15 are respectively formed in side surfaces 4B, 4C of the bearing section 4. However, any one of the thrust dynamic pressure producing grooves 14, 15 may be omitted.

The provision of the required dynamic pressure reducing grooves around the bearing section 4 in this manner needs only surface forming of the bearing section 4. This provides an advantage that the dynamic pressure producing grooves are easy to form with efficiency.

The shaft section 5 is formed integral with the hub 6 to form a rotor. In the present embodiment the hub 6 is mounted with the rotor magnet 7 thus forming a rotor unit U2.

The shaft section 5 is press-fitted and fixed in an inner peripheral surface 4D of the bearing section 4. That is, the spindle motor 1 can be assembled by fixing the sleeve-and-bearing unit U1 in the base 2 mounted with the stator coil 8 and then press-fitting the shaft section 5 of the rotor unit U2 into the bearing section 4 of the sleeve-and-bearing unit U1 thereby fixing the sleeve-and-bearing unit U1 to the rotor unit U2.

Here, the shaft section 5 is formed with a convex-formed spherical surface 5A at its tip. This provides the outer peripheral portion of the shaft section 5 at a tip thereof with a spacing from the sleeve 3. This reduces the frictional force undergone by the shaft section 5 at a start and end of rotation, thus providing more preferred rotation characteristics.

In this case, a space 16 is formed between the shaft section 5, the sleeve 3, and the bearing section 4, to allow dynamic pressure producing liquid to be collected therein. It is therefore possible to supplement for evaporation of dynamic pressure producing liquid over a long period of time.

Figure 3A:
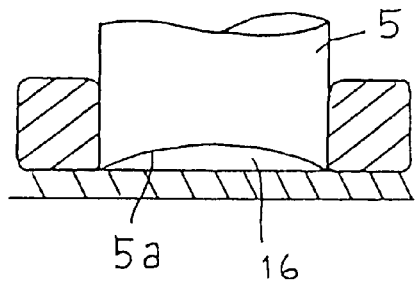
FIGS. 3(a) thru 3(d) are views showing modifications to a shaft section shown in FIG. 1.
Figure 3B:
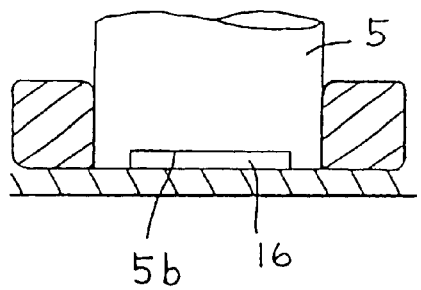
Figure 3C:
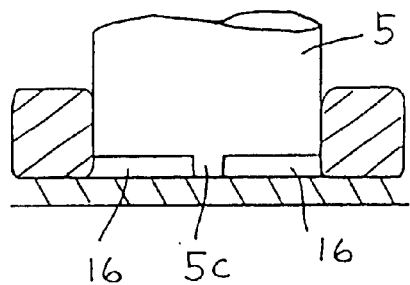
Figure 3D:
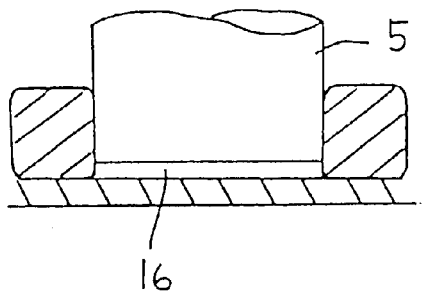

Incidentally, the means to form the space 16 is not limited to the above but may be in forms as exemplified in FIG. 3A to FIG. 3D. FIG. 3A shows a case of providing a concave spherical surface 5a in the shaft section 5, FIG. 3B a case of forming a depression 5b inward the shaft section 5, FIG. 3C a case of forming a convex portion 5c in a center of the shaft section 5, and FIG. 3D a case that a space 16 is formed between a tip of the shaft section 5 and the sleeve 3 when the shaft section 5 is shortened in length and the shaft section 5 is press-fitted into the bearing section 4.

It is noted that a space 16 if provided in this manner may cause occurrence of air bubbles due to negative pressure of the liquid collected there upon rotation of the shaft section 5. In order to solve such a disadvantage, vertical circulatory grooves 17 may be formed in the inner peripheral surface of the bearing section 4.

Figure 4:
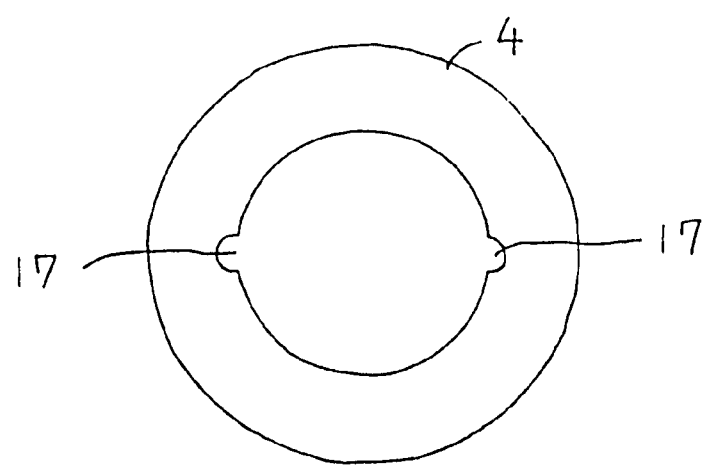
FIG. 4 is a view showing a modification to a bearing section shown in FIG. 1.

Referring to FIG. 4, there is illustrated a bearing section 4 provided with vertical circulatory grooves 17. The provision of at least one or, if necessary, a plurality of such vertical circulatory grooves 17 can cause a required liquid to circulate around the bearing section 4 thereby supplying a proper amount of a required liquid for producing dynamic pressure to the bearing section 4.

In the meanwhile, in the structure as shown in FIG. 1 temperature change may cause deformation in each part as well as change in viscosity of the dynamic pressure producing liquid, which changes the rigidity of the shaft in the bearing section 4 causing a worse effect on torque characteristics of the spindle motor 1. In order to avoid this, the embodiment of FIG. 1 has a linear expansion coefficient of the bearing section 4 set greater than a linear expansion coefficient of the sleeve 3. This provides a structure that, if temperature changes, both the members compensate for each other to have a shaft rigidity less affected by temperature.

Specifically, this is achieved by making the sleeve 3 of a copper based metal material and the bearing section 4 of a stainless steel based metal material.

As shown in FIG. 1, in the spindle motor 1 the hub 6 at its outer end is close to the sleeve 3, forming a labyrinth 18. As a result, in the case where dusts such as magnetic particles or oil mist accumulate within the spindle motor 1, such magnetic particles or dusts produced are effectively prevented from scattering to an outside. Accordingly, where the spindle motor 1 is mounted for example in a hard disc drive apparatus, dusts such as magnetic particles or oil dust are prevented from scattering thus helping realize a high performance hard disc drive apparatus.

Figure 5:
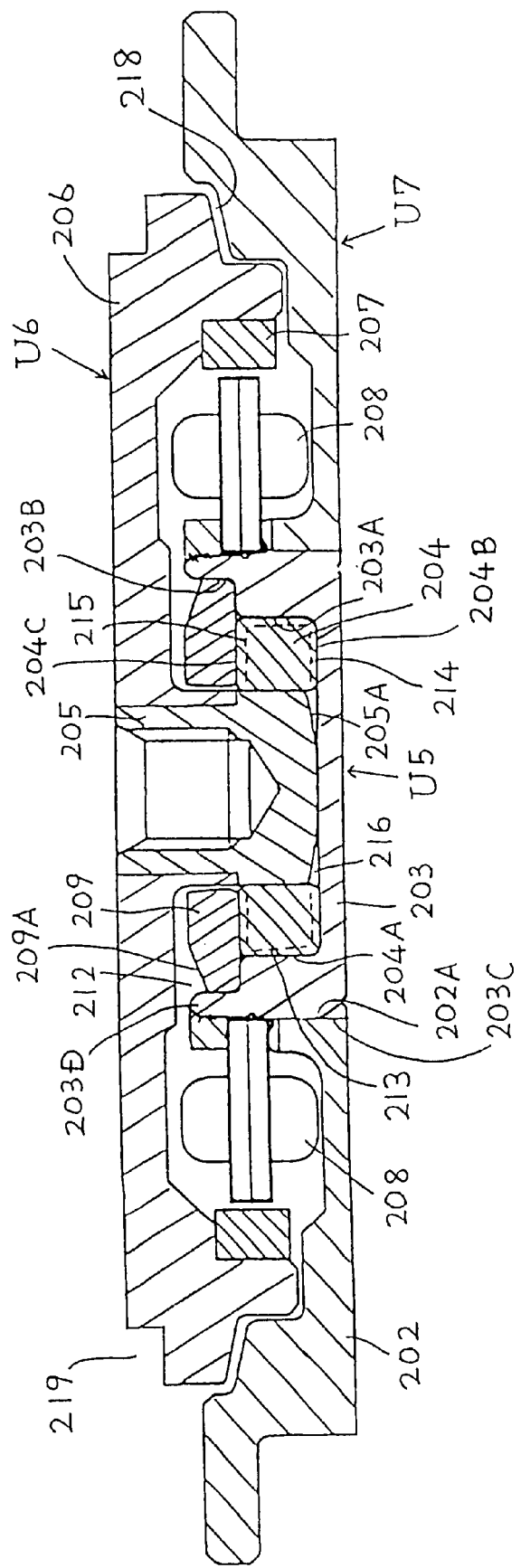
FIG. 5 is a sectional view showing a second embodiment of a spindle motor according to the invention.

Referring to FIG. 5, there is illustrated a second embodiment of a spindle motor 101 according to the invention. This spindle motor 101 basically employs the same parts as those constituting for the spindle motor 1. Accordingly, the corresponding parts of the spindle motor 101 to those of the spindle motor 1 are denoted by the same reference numerals of a 100 level, omitting explanations thereof.

The spindle motor 101 is different from the spindle motor 1 only in that a shaft 105 and a hub 106 are separated, a sleeve 103, bearing section 104, shaft section 105 and hold member 109 are made as a unit to form a sleeve-bearing-shaft unit U3, and the hub 106 and rotor magnet 107 are made as a unit forming a hub unit U4.

According to the structure of the spindle motor 101, if only the hub 106 must be modified in specification, it will be satisfactory to change only the hub unit U4, offering for advantage in cost.

As for each part of the spindle motor 101, various modifications are possible similarly to the above explanation, hence providing a similar advantage.

Figure 6:
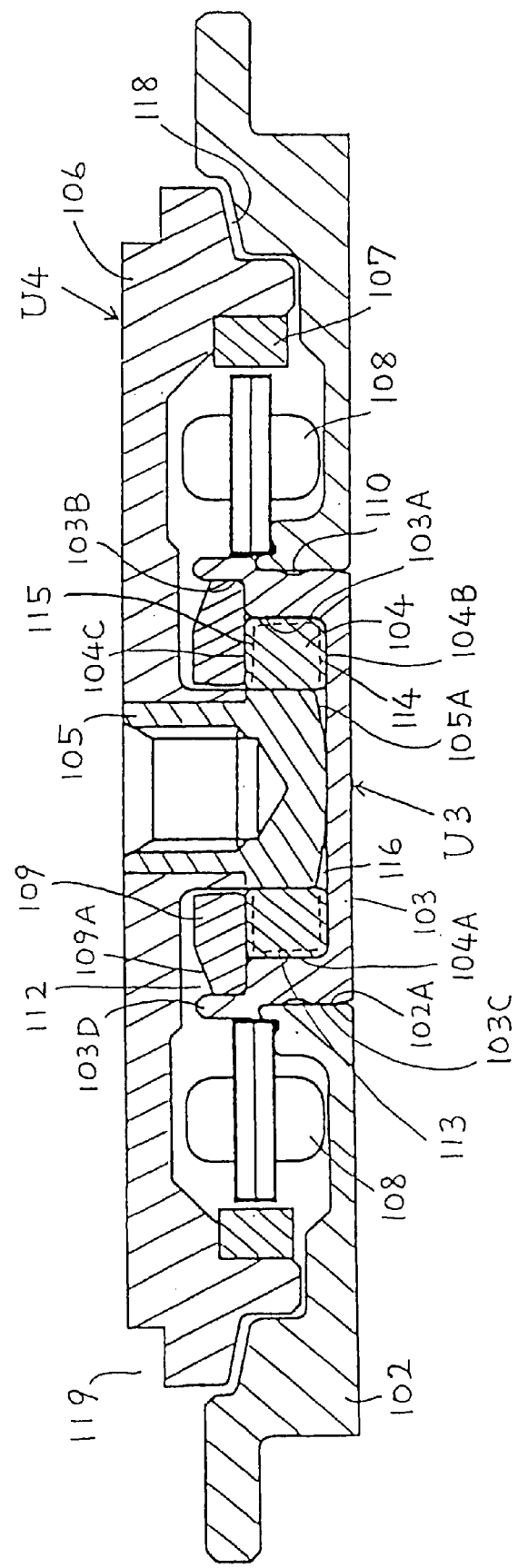
FIG. 6 is a sectional view showing a third embodiment of a spindle motor according to the invention.

Referring to FIG. 6, there is illustrated a third embodiment of a spindle motor 201 according to the invention. This spindle motor 201 basically employs the same parts as those for the spindle motor 1 of FIG. 1. Accordingly, the corresponding parts of the spindle motor 201 to those of the spindle motor 1 are denoted by the same reference numerals of a 200 level, omitting explanations thereof.

The spindle motor 201 is different from the spindle motor 1 only in that a shaft 205 and a hub 206 are separated, a sleeve 203, bearing section 204, shaft section 205, and hold member 209 are made as a unit to form a sleeve-bearing-shaft unit U5, the hub 206 and rotor magnet 207 are made as a unit forming a hub unit U6, and a stator coil 208 is fixed on the sleeve 203 into a unit constituting as a base unit U7.

According to the structure of the spindle motor 201, if the hub 206 must be modified in accordance with specification, it will be satisfactory to change only the hub unit U6, thus offering convenience.

As for each part of the spindle motor 201, various modifications are possible similarly to the case of the spindle motor 1 of FIG. 1 hence providing a similar advantage.

According to the present invention, because the constituent elements are utilized for spindle motor are, it is possible to implement checking on a unit-by-unit basis during manufacture. If there is an unacceptable unit, it is satisfactory to merely scrap the same unit. In the case that some parts require modification due to diversification of specifications, the unitized common parts can be still used without change, making it unnecessary to increase parts for each model. Also, such unitization makes possible to cope with an unacceptable unit by merely removing it. Thus, cost reduction is to be expected. In this manner, parts can be made common for all the models, resulting in cost reduction. Furthermore, even where a part is built in an apparatus and thereafter becomes poor, the apparatus and its parts can be reusable.

The other effects of the invention will be listed below.

An adhesive groove is provided in an outer peripheral surface of the sleeve to hold an adhesive for fixing the sleeve to the base, and the sleeve at the outer peripheral surface is fixed to the base through the adhesive. Fixing with adhesion is favorably made.

Because the shaft section has a tip formed with a convex spherical surface, it is possible to reduce a frictional force to be applied to the shaft section at a start and stop of the motor. Thus, a high performance motor is realized.

Because the bearing section has a linear expansion coefficient greater than that of the sleeve, the shaft rigidity is less affected due to temperature change.

In the case of making the bearing section as a fluid dynamic pressure bearing, a vertical circulatory groove is provided in an inner peripheral surface of the bearing section. Accordingly, a dynamic pressure producing fluid can be circulated around the bearing, thereby obtaining a favorable bearing characteristics.

Because a space is formed by the shaft section, the bearing section, and the sleeve to collect a dynamic pressure fluid, a dynamic pressure fluid is smoothly supplied.

A radial dynamic pressure producing groove is formed in an outer peripheral surface of the bearing section and a thrust dynamic pressure producing groove is formed in one side surface of the bearing section. Accordingly, it is satisfactory to form the dynamic pressure producing grooves only in the surface of the bearing section. This facilitates forming and hence improving forming efficiency.

Because the sleeve is made in a cap form and the bearing section in the sleeve is rotatably held in the sleeve by an annular pressing member press-fitted in the sleeve, assembling is easy to perform.

In this case, if the sleeve has an inner peripheral surface end edge projecting greater than the pressing member to thereby form an adhesive reservoir close to the inner peripheral surface end edge of the sleeve, it is possible to prevent the adhesive from flowing outside.

If the base and the rotor unit at an outer peripheral edge form an opposed portion and a labyrinth is formed in the opposed portion, then in the event that dusts, such as magnetic particles or oil mist, accumulate at an inside portion, it is possible to prevent them from being discharged to an outside. This is very effective if applied for a hard disc drive apparatus.

If a wide annular groove is circumferentially formed in an outer peripheral surface of the sleeve and the sleeve is press-fitted in a fitting hole opened correspondingly in the base to the sleeve thereby fixing the sleeve to the base, then fixing is possible without using an adhesive, thus improving operationality.

The annular groove may be also utilized as an adhesive groove, and the sleeve may be fixed to the base using both press-fit and adhesion, thereby providing further firm fixing.

If the annular groove is formed in a corresponding position to the bearing section, no deforming stress is applied to the bearing section upon press-fitting. Thus, high performance bearing can be realized.

What is claimed is:

1. A spindle motor comprising: a base; a stator coil connected to the base; a sleeve-and-bearing unit connected to a central portion of the base, the sleeve-and-bearing unit having a sleeve and a bearing section mounted in the sleeve and having a linear expansion coefficient greater than that of the sleeve, the sleeve having a groove disposed in an outer peripheral surface thereof for receiving an adhesive material for connecting the base to the outer peripheral surface of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil.

2. A spindle motor according to claim 1; wherein the bearing section comprises a copper-based metal; and wherein the sleeve comprises a stainless-based metal.

3. A spindle motor according to claim 1; wherein the bearing section comprises a fluid dynamic pressure bearing.

4. A spindle motor according to claim 3; wherein the bearing section comprises a copper-based metal; and wherein the sleeve comprises a stainless-based metal.

5. A spindle motor comprising: a base; a stator coil connected to the base; a sleeve-and-bearing unit connected to a central portion of the base, the sleeve-and-bearing unit having a generally cap-shaped sleeve, a bearing section mounted in the sleeve, and a pressing member connected to the sleeve by press-fit for supporting the bearing section in the sleeve, the sleeve having a groove disposed in an outer peripheral surface thereof for receiving an adhesive material for connecting the base to the outer peripheral surface of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil.

6. A spindle motor according to claim 5; wherein the sleeve has an inner peripheral surface portion connected to the pressing member to thereby form with the pressing member an adhesive reservoir for receiving an adhesive material.

7. A spindle motor according to claim 5; wherein the pressing member is generally annular-shaped.

8. A spindle motor comprising: a base; a stator coil connected to the base; a sleeve-and-bearing unit connected to a central portion of the base, the sleeve-and-bearing unit having a sleeve and a bearing section mounted in the sleeve, the sleeve having a groove disposed in an outer peripheral surface thereof for receiving an adhesive material for connecting the base to the outer peripheral surface of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil, the hub having an outer peripheral surface portion disposed opposite to and spaced apart from an outer peripheral surface portion of the base so as to form a labyrinth structure.

9. A spindle motor comprising: a base having a central hole; a stator coil connected to the base; a sleeve-and-bearing unit connected to a central portion of the base, the sleeve-and-bearing unit having a sleeve and a bearing section mounted in the sleeve and having a linear expansion coefficient greater than that of the sleeve, the sleeve being press-fitted in the central hole of the base so that a peripheral surface portion of the base abuts a groove formed circumferentially in an outer peripheral surface portion of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil.

10. A spindle motor according to claim 9; wherein the bearing section comprises a copper-based metal; and wherein the sleeve comprises a stainless-based metal.

11. A spindle motor according to claim 9; wherein the bearing section comprises a fluid dynamic pressure bearing.

12. A spindle motor according to claim 11; wherein the bearing section comprises a copper-based metal; and wherein the sleeve comprises a stainless-based metal.

13. A spindle motor according to claim 9; wherein the shaft section has a tip having a convex spherical surface.

14. A spindle motor comprising: a base having a central hole; a stator coil connected to the base; a sleeve-and-bearing unit connected to a central portion of the base, the sleeve-and-bearing unit having a sleeve and a fluid dynamic pressure bearing section mounted in the sleeve, the sleeve being press-fitted in the central hole of the base so that a peripheral surface portion of the base abuts a groove formed circumferentially in an outer peripheral surface portion of the sleeve, the fluid dynamic pressure bearing section having a first groove disposed in an outer peripheral surface thereof for generating a radial dynamic pressure, and a plurality of second grooves each disposed in a respective one of an upper side surface and a lower side surface of the fluid dynamic pressure bearing section for generating thrust dynamic pressure; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil.

15. A spindle motor comprising: a base having a central hole; a stator coil connected to the base; a sleeve-and-bearing unit connected to a central portion of the base, the sleeve-and-bearing unit having a generally cap-shaped sleeve, a bearing section mounted in the sleeve, and a pressing member connected to the sleeve by press-fit for supporting the bearing section in the sleeve, the sleeve being press-fitted in the central hole of the base so that a peripheral surface portion of the base abuts a groove formed circumferentially in an outer peripheral surface portion of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil.

16. A spindle motor according to claim 15; wherein the sleeve has an inner peripheral surface portion connected to the pressing member to thereby form with the pressing member an adhesive reservoir for receiving an adhesive material.

17. A spindle motor comprising: a base having a central hole; a stator coil connected to the base; a sleeve-and-bearing unit connected to a central portion of the base, the sleeve-and-bearing unit having a sleeve and a bearing section mounted in the sleeve, the sleeve being press-fitted in the central hole of the base so that a peripheral surface portion of the base abuts a groove formed circumferentially in an outer peripheral surface portion of the sleeve; and a rotor unit connected to the sleeve-and-bearing unit for undergoing rotation relative to the sleeve-and-bearing unit, the rotor unit having a shaft section supported by the bearing section for undergoing rotation, a hub connected to the shaft section for rotation therewith, and a rotor magnet connected to the hub and disposed opposite to and spaced apart from the stator coil, the hub having an outer peripheral surface portion disposed opposite to and spaced apart from an outer peripheral surface portion of the base so as to form a labyrinth structure.

18. A spindle motor comprising: a base; a stator coil connected to the base; a sleeve-shaft-bearing unit connected to a central portion of the base, the sleeve-shaft-bearing unit having a sleeve, a bearing section mounted in the sleeve and having a linear expansion coefficient greater than that of the sleeve, and a shaft section supported by the bearing section for undergoing rotation, the sleeve having a groove disposed in an outer peripheral surface thereof for receiving an adhesive material for connecting the base to the outer peripheral surface of the sleeve; and a hub unit having a hub connected to the shaft section for rotation therewith and a rotor magnet connected to the hub for rotation therewith and disposed opposite to and spaced apart from the stator coil.

19. A spindle motor according to claim 18; wherein the bearing section comprises a copper-based metal; and wherein the sleeve comprises a stainless-based metal.

20. A spindle motor according to claim 19; wherein the base and the stator coil are connected together as a unit.

21. A spindle motor according to claim 18; wherein the bearing section comprises a fluid dynamic pressure bearing.

22. A spindle motor according to claim 21; wherein the base and the stator coil are connected together as a unit.

23. A spindle motor according to claim 21; wherein the bearing section comprises a copper-based metal; and wherein the sleeve comprises a stainless-based metal.

24. A spindle motor according to claim 23; wherein the base and the stator coil are connected together as a unit.

25. A spindle motor comprising: a base; a stator coil connected to the base; a sleeve-shaft-bearing unit connected to a central portion of the base, the sleeve-shaft-bearing unit having a generally cap-shaped sleeve, a bearing section mounted in the sleeve, a pressing member connected to the sleeve by press-fit for supporting the bearing section in the sleeve, and a shaft section supported by the bearing section for undergoing rotation, the sleeve having a groove disposed in an outer peripheral surface thereof for receiving an adhesive material for connecting the base to the outer peripheral surface of the sleeve; and a hub unit having a hub connected to the shaft section for rotation therewith and a rotor magnet connected to the hub for rotation therewith and disposed opposite to and spaced apart from the stator coil.

26. A spindle motor according to claim 25; wherein the sleeve has an inner peripheral surface portion connected to the pressing member to thereby form with the pressing member an adhesive reservoir for receiving an adhesive material.

27. A spindle motor according to claim 26; wherein the base and the stator coil are connected together as a unit.

28. A spindle motor according to claim 25; wherein the base and the stator coil are connected together as a unit.

29. A spindle motor according to claim 25; wherein pressing member is generally annular-shaped.

30. A spindle motor comprising: a base; a stator coil connected to the base; a sleeve-shaft-bearing unit connected to a central portion of the base, the sleeve-shaft-bearing unit having a sleeve, a bearing section mounted in the sleeve, and a shaft section supported by the bearing section for undergoing rotation, the sleeve having a groove disposed in an outer peripheral surface thereof for receiving an adhesive material for connecting the base to the outer peripheral surface of the sleeve; and a hub unit having a hub connected to the shaft section for rotation therewith and a rotor magnet connected to the hub for rotation therewith and disposed opposite to and spaced apart from the stator coil, the hub having an outer peripheral surface portion disposed opposite to and spaced apart from an outer peripheral surface portion of the base so as to form a labyrinth structure.

31. A spindle motor comprising: a base having a central hole; a stator coil connected to the base; a sleeve-shaft-bearing unit connected to a central portion of the base, the sleeve-shaft-bearing unit having a sleeve, a bearing section mounted in the sleeve and having a linear expansion coefficient greater than that of the sleeve, and a shaft section supported by the bearing section for undergoing rotation, the sleeve being press-fitted in the central hole of the base so that a peripheral surface portion of the base abuts a groove formed circumferentially in an outer peripheral surface portion of the sleeve; and a hub unit having a hub connected to the shaft section for rotation therewith and a rotor magnet connected to the hub for rotation therewith and disposed opposite to and spaced apart from the stator coil.

32. A spindle motor according to claim 31; wherein the bearing section comprises a copper-based metal; and wherein the sleeve comprises a stainless-based metal.

33. A spindle motor according to claim 32; wherein the base and the stator coil are connected together as a unit.

34. A spindle motor according to claim 31; wherein the shaft section has a tip having a convex spherical surface.

35. A spindle motor according to claim 34; wherein the base and the stator coil are connected together as a unit.

36. A spindle motor according to claim 31; wherein the bearing section comprises a fluid dynamic pressure bearing.

37. A spindle motor according to claim 36; wherein the base and the stator coil are connected together as a unit.

38. A spindle motor according to claim 36; wherein the bearing section comprises a copper-based metal; and wherein the sleeve comprises a stainless-based metal.

39. A spindle motor according to claim 38; wherein the base and the stator coil are connected together as a unit.

40. A spindle motor comprising: a base having a central hole; a stator coil connected to the base; a sleeve-shaft-bearing unit connected to a central portion of the base, the sleeve-shaft-bearing unit having a sleeve, a fluid dynamic pressure bearing section mounted in the sleeve, and a shaft section supported by the fluid dynamic pressure bearing section for undergoing rotation, the sleeve being press-fitted in the central hole of the base so that a peripheral surface portion of the base abuts a groove formed circumferentially in an outer peripheral surface portion of the sleeve, the fluid dynamic pressure bearing section having a first groove disposed in an outer peripheral surface thereof for generating a radial dynamic pressure, and a plurality of second grooves each disposed in a respective one of an upper side surface and a lower side surface of the fluid dynamic pressure bearing section for generating thrust dynamic pressure; and a hub unit having a hub connected to the shaft section for rotation therewith and a rotor magnet connected to the hub for rotation therewith and disposed opposite to and spaced apart from the stator coil.

41. A spindle motor comprising: a base having a central hole; a stator coil connected to the base; a sleeve-shaft-bearing unit connected to a central portion of the base, the sleeve-shaft-bearing unit having a generally cap-shaped sleeve, a bearing section mounted in the sleeve, a pressing member connected to the sleeve by press-fit for supporting the bearing section in the sleeve, and a shaft section supported by the bearing section for undergoing rotation, the sleeve being press-fitted in the central hole of the base so that a peripheral surface portion of the base abuts a groove formed circumferentially in an outer peripheral surface portion of the sleeve; and a hub unit having a hub connected to the shaft section for rotation therewith and a rotor magnet connected to the hub for rotation therewith and disposed opposite to and spaced apart from the stator coil.

42. A spindle motor according to claim 41; wherein the sleeve has an inner peripheral surface portion connected to the pressing member to thereby form with the pressing member an adhesive reservoir for receiving an adhesive material.

43. A spindle motor according to claim 42; wherein the base and the stator coil are connected together as a unit.

44. A spindle motor comprising: a base having a central hole; a stator coil connected to the base; a sleeve-shaftbearing unit connected to a central portion of the base, the sleeve-shaft-bearing unit having a sleeve, a bearing section mounted in the sleeve, and a shaft section supported by the bearing section for undergoing rotation, the sleeve being press-fitted in the central hole of the base so that a peripheral surface portion of the base abuts a groove formed circumferentially in an outer peripheral surface portion of the sleeve; and a hub unit having a hub connected to the shaft section for rotation therewith and a rotor magnet connected to the hub for rotation therewith and disposed opposite to and spaced apart from the stator coil, the hub having an outer peripheral surface portion disposed opposite to and spaced apart from an outer peripheral surface portion of the base so as to form a labyrinth structure.

* * * * *